(12) United States Patent
Ferreol et al.

(10) Patent No.: US 7,999,739 B2
(45) Date of Patent: Aug. 16, 2011

(54) 1D OR 2D GONIOMETRY METHOD OF DIFFUSE SOURCES

(75) Inventors: Anne Ferreol, Colombes (FR);
Blandine Vibert, Paris (FR); Philippe Morgand, Athis-Mons (FR)

(73) Assignee: Thales (FR)

( * ) Notice: Subject to any disclaimer, the term of this patent is extended or adjusted under 35 U.S.C. 154(b) by 734 days.

(21) Appl. No.: 11/815,291

(22) PCT Filed: Feb. 1, 2005

(86) PCT No.: PCT/EP2005/050430
§ 371 (c)(1),
(2), (4) Date: Apr. 11, 2008

(87) PCT Pub. No.: WO2006/081871
PCT Pub. Date: Aug. 10, 2006

(65) Prior Publication Data
US 2009/0073041 A1    Mar. 19, 2009

(51) Int. Cl.
*G01S 3/12* (2006.01)
(52) U.S. Cl. .................................................. 342/441
(58) Field of Classification Search .................. 342/441, 342/440
See application file for complete search history.

(56) References Cited

U.S. PATENT DOCUMENTS 6,744,407 B2 * 6/2004 Ferreol .................... 342/441
2004/0253987 A1 * 12/2004 Lee ........................ 455/562.1

OTHER PUBLICATIONS

Lee, Seong Ro et al, "Estimation of Distributed Elevation and Azimuth Angles Using Linear Arrays," IEEE Conf. Proc. MILCOM 1996, pp. 868-872.*
Bengtsson, Mats et al, "Low-Complexity Estimators for Distributed Sources," IEEE Trans. on Signal Proc. vol. 48, No. 8, Aug. 2000, pp. 2185-2194.*
Shahbazpanahi, Shahram et al, "Distributeed Source Localization Using ESPIRIT Algorithm," IEEE Trans. on Signal Processing, vol. 49, No. 10, Oct. 2001, pp. 2169-2178.*
Valaee et al., "Parametric Localization of Distributed Sources", IEEE Transactions on Signal Processing, IEEE, Inc., vol. 43, No. 9, pp. 2144-2153 (1995) XP000536025.
Asztely et al., "A Generalized Array Manifold Model for Local Scattering in Wireless Communications", Acoustics, Speech, and Signal Processing, vol. 5, pp. 4021-4024 (1997) XP010226684.

(Continued)

*Primary Examiner* — Gregory C Issing
(74) *Attorney, Agent, or Firm* — Lowe Hauptman Ham & Berner, LLP (57) ABSTRACT

A goniometry method for one or several diffuse (or distributed) sources is disclosed. The sources or sources having one or more give directions and a diffusion cone. The sources are received by an array of several sensors. The method breaks down the diffusion cone into a finite number L of diffusers. A diffuser has the parameters $(\theta_{mp}, \delta\theta_{mpi}, \Delta_{mp}, \delta\Delta_{mpi})$, associated with it. Directing vectors $a(\theta_{mp}+\delta\theta_{mpi}, \Delta_{mp}+\delta\Delta_{mpi})$ associated with the L diffusers are combined to obtain a vector $(D(\theta, \Delta, \delta\theta, \delta\Delta) \alpha$ or $U(\theta, \Delta) \beta(\delta\theta, \delta\Delta, \alpha))$ dependent on at least one of the incidence and deflection parameters $(\theta, \Delta, \delta\theta, \delta\Delta)$ and on the combination vector $\alpha$. A MUSIC-type criterion or other goniometry algorithm is applied to the vectors $D(\theta, \Delta, \delta\theta, \delta\Delta) \alpha$ or $U(\theta, \Delta) \beta(\delta\theta, \delta\Delta, \alpha)$ obtained in order to determine at least one of the incidence parameters $\theta_{mp}, \Delta_{mp}, \delta\theta_{mp}, \delta\Delta_{mp}$ of the associated diffusion cone.

9 Claims, 7 Drawing Sheets

OTHER PUBLICATIONS

Jantti T-P Ed, Institute of Electrical and Electronics Engineers, "The Influence of Extended Sources on the Theoretical Performance of the Music and Esprit Methods: Narrow-Band Sources", vol. 5, Conf. 17, pp. 429-432 (1992) XP010058769.

Shahbazpanahi et al., "Parametric Localization of Multiple Incoherently Distributed Sources Using Covariance Fitting", Sensor Array and Multichannel Signal Processing Workshop Proceedings, pp. 332-336 (2002) XP010635765.

Bengtsson et al., "Low-Complexity Estimators for Distributed Sources", IEEE Transactions on Signal Processing, vol. 48, pp. 2185-2194 (2000) XP002347119.

* cited by examiner

1D OR 2D GONIOMETRY METHOD OF DIFFUSE SOURCES

RELATED APPLICATIONS

The present Application is based on International Application No. PCT/EP2005/050430, filed on Feb. 1, 2005, which in turn corresponds to French Application No. 02 11072 filed on Sep. 6, 2002, and priority is hereby claimed under 35 USC §119 based on these applications. Each of these applications are hereby incorporated by reference in their entirety into the present application.

FIELD OF THE INVENTION

The present invention relates to a goniometry method for one or more diffuse, or "distributed", radiofrequency sources, the source of given direction being considered by the receivers as a diffusion cone with a certain width and an average incidence.

BACKGROUND OF THE INVENTION

A distributed source is defined notably as a source which is propagated through a continuum of diffusers.

The invention makes it possible notably to locate, in angles and/or in azimuth, one or more distributed radio frequency sources. The object is, for example, to determine the incidence of the centers of the diffusion cones and their widths.

The goniometry is produced either in one dimension, 1D, where the incidences are parameterized by the azimuth, or in two dimensions, 2D, where the incidence depends on both azimuth and elevation parameters.

It applies, for example, for decorrelated or partially decorrelated coherent signals originating from diffusers.

Figure 1:
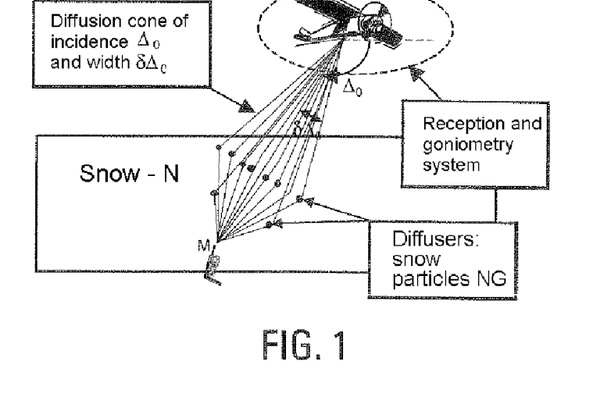

FIG. 1 diagrammatically represents the example of diffusion of the wave from cell phone M through a layer of snow $N_G$, for example to the receivers Ci of the reception system of an airplane A. The cone, called diffusion cone, has a certain width and an average incidence. The snow particles $N_G$ act as diffusers.

Figure 2:
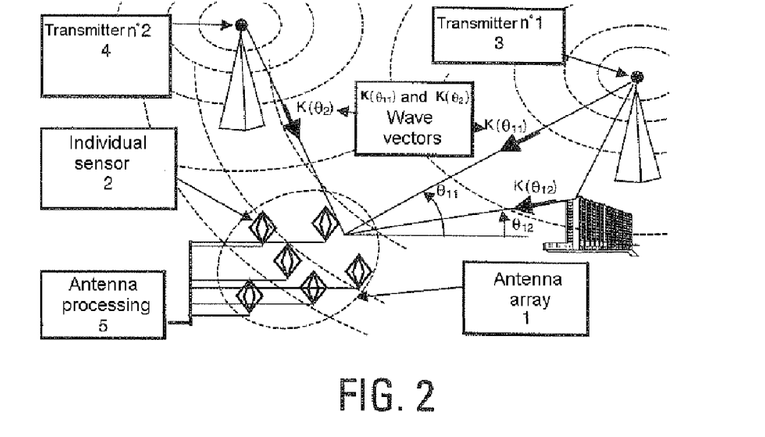
Figure 3:
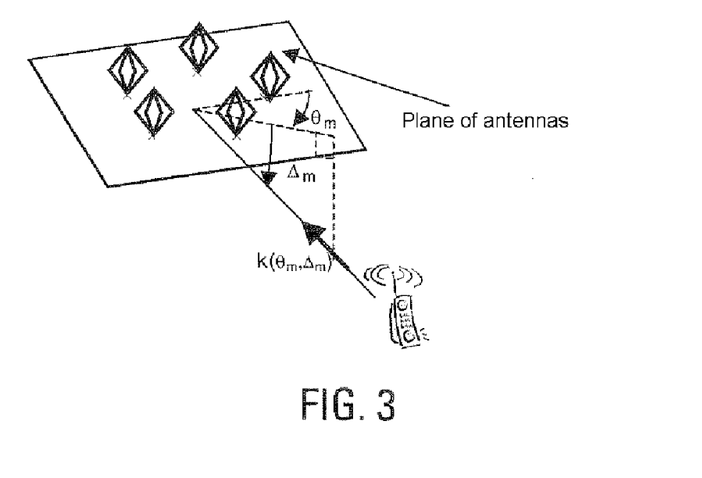

In the field of antenna processing, a multiple-antenna system receives one or more radiocommunication transmitters. The antenna processing therefore uses the signals originating from multiple sensors. In an electromagnetic context, the sensors are antennas. FIG. 2 shows how any antenna processing system consists of an array 1 with several antennas 2 (or individual sensors) receiving the multiple paths from multiple radiofrequency transmitters 3, 4, from different incidence angles and an antenna processing device 5. The term "source" is defined as a multiple path from a transmitter. The antennas of the array receive the sources with a phase and an amplitude dependent on their incidence angle and on the positioning of the antennas. The incidence angles can be parameterized, either in 1D azimuth-wise $\theta_m$, or in 2D, azimuth-wise $\theta_m$ and elevation-wise $\Delta_m$. FIG. 3 shows that a goniometry is obtained in 1D when the waves from the transmitters are propagated in one and the same plane and a 2D goniometry must be applied in other cases. This plane P can be that of the array of antennas where the elevation angle is zero.

The main objective of the antenna processing techniques is to exploit the space diversity, namely, the use of the spatial position of the antennas of the array to make better use of the incidence and distance divergences of the sources. More particularly, the objective of the goniometry or the locating of radiofrequency sources is to estimate the incidence angles of the transmitters from an array of antennas.

Conventionally, the goniometry algorithms such as MUSIC described, for example, in reference [1] (the list of references is appended) assume that each transmitter is propagated according to a discrete number of sources to the listening receivers. The wave is propagated either with a direct path or along a discrete number of multiple paths. In FIG. 2, the first transmitter referenced 3 is propagated along two paths of incidences $\theta_{11}$ and $\theta_{12}$ and the second transmitter referenced 4 along a direct path of incidence $\theta_2$. To estimate the incidences of all of these discrete sources, their number must be strictly less than the number of sensors. For sources that have diffusion cones of non-zero width, the goniometry methods described in document [1] are degraded because of the inadequacy of the signal model.

References [2] [3] [4] propose solutions for the goniometry of distributed sources. However, the proposed goniometry algorithms are in azimuth only: 1D. Also, the time signals of the diffusers originating from one and the same cone are considered to be either coherent in references [2] and [3], or incoherent in references [3] [4]. Physically, the signals of the diffusers are coherent when they are not temporally shifted and have no Doppler shift. Conversely, these signals are incoherent when they are strongly shifted in time or when they have a significant Doppler shift. The time shift of the diffusers depends on the length of the path that the waves follow through the diffusers and the Doppler depends on the speed of movement of the transmitter or of the receivers. These comments show how references [2] [3] [4] do not handle the more common intermediate case of diffusers with partially correlated signals. Also, the algorithms [2] [4] strongly depend on an "a priori" concerning the probability density of the diffusion cones angle-wise. It is then sufficient for these densities to be slightly different from the "a priori" for the algorithms [2] [4] no longer to be suitable.

SUMMARY OF THE INVENTION

The subject of the invention concerns notably distributed sources which are received by the listening system in a so-called diffusion cone having a certain width and an average incidence as described for example in FIG. 1.

In this document, the word "source" denotes a multiple-path by diffusion from a transmitter, the source being seen by the receivers in a diffusion cone of a certain width and an average incidence. The average incidence is defined notably by the direction of the source.

The invention relates to a goniometry method for one or several diffuse sources of given directions, the source or sources being characterized by one or more given directions and by a diffusion cone. It is characterized in that it comprises at least the following steps:

a) breaking down the diffusion cone into a finite number L of diffusers, a diffuser having the parameters $(\theta_{mp}, \delta\theta_{mpi}, \Delta_{mp}, \delta\Delta_{mpi})$, associated with it, b) combining the directing vectors $a(\theta_{mp}+\delta\theta_{mpi}, \Delta_{mp}+\delta\Delta_{mpi})$ associated with the L diffusers to obtain a vector $(D(\theta, \Delta, \delta\theta, \delta\Delta) \alpha$ or $U(\theta, \Delta) \beta(\delta\theta, \delta\Delta, \alpha))$ dependent on at least one of the incidence and deflection parameters $(\theta, \Delta, \delta\theta, \delta\Delta)$ and on the combination vector $\alpha$, c) applying a MUSIC-type criterion or any other goniometry algorithm to the vectors $D(\theta, \Delta, \delta\theta, \delta\Delta) \alpha$ or $U(\theta, \Delta) \beta(\delta\theta, \delta\Delta, \alpha)$ obtained in the step b) in order to determine at least one of the incidence parameters $\theta_{mp}, \Delta_{mp}, \delta\theta_{mp}, \delta\Delta_{mp}$ of the associated diffusion cone.

The minimizing step is, for example, performed on the matrix $D(\theta, \Delta, \delta\theta, \delta\Delta)$ and implemented according to the parameters $\theta, \Delta, \delta\theta, \delta\Delta$.

The minimizing step can be performed on the matrix $D_s(\theta, \Delta, \delta\theta, \delta\Delta)$ where the parameters $\delta\theta$ and/or $\delta\Delta$ are replaced by their opposites.

According to a variant of embodiment, the algorithm comprises a step of limited development of the directing vectors about the central incidence of the cone in order to separate the incidences $(\theta, \Delta)$ and the deflections $\delta\theta, \delta\Delta$ and in that the minimizing step is performed according to the parameters $(\theta, \Delta)$ on a matrix $U(\theta, \Delta)$ dependent on the incidences in order to determine the parameters $\theta_{mp}, \Delta_{mp}$ minimizing the criterion, then secondly to determine the deflection parameters $\delta\theta_{mp}, \delta\Delta_{mp}$ from the parameters $\theta_{mp}, \Delta_{mp}$.

The minimizing step is, for example, performed on the matrix $U_s(\theta, \Delta)$ dependent on $U(\theta, \Delta)$.

The matrix $D(\theta, \delta\theta)$ can be dependent only on the azimuth angle $\theta$ and on the deflection vector $\delta\theta$ of this angle.

The minimizing step is, for example, performed on the matrix $D_s(\theta, \delta\theta)$, where the parameter $\delta\theta$ is replaced by its opposite.

The method can include a step of limited development of the vectors of the matrix $D(\theta, \delta\theta)$, the minimizing step being performed on a matrix $U(\theta)$ in order to determine the incidence angle parameters $\theta_{mp}$ and, from these parameters, the angle offset parameters $\delta\theta_{mp}$.

The minimizing step is performed on the matrix $U_s(\theta)$ dependent on $U(\theta)$.

The object of the invention has notably the following advantages:
  producing a goniometry in azimuth and/or in azimuth-elevation,
  reducing the calculation cost of the method by using a limited development of the directing vectors,
  taking into account any type of diffusers, notably partially-correlated diffusers.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 1, a representation of the diffusion of a wave from a cell phone through a layer of snow, FIG. 2, an exemplary architecture of an antenna processing system, FIG. 3, an exemplary 2D goniometry in azimuth-elevation, FIG. 4, a diagram of the steps of the first variant of the goniometry of distributed sources in azimuth and elevation, FIG. 5, a diagram of a variant of FIG. 4, taking account of the angular symmetry of the diffusion cones, FIG. 6, a second variant of the goniometry method for the distributed sources in azimuth and bearing, FIG. 7, the symmetrical version of the variant of FIG. 6, FIG. 8, the steps of the first variant of the goniometry in azimuth of the distributed sources, FIGS. 9 and 10, results of goniometry in azimuth of one or more distributed sources associated with the first variant of the algorithm, FIG. 11, the symmetrical variant of FIG. 8, FIG. 12, the steps associated with a second variant of the goniometry in azimuth method, FIGS. 13 and 14, two results of goniometry in azimuth of distributed sources, FIG. 15, a diagram of the symmetrical version of the second goniometry in azimuth variant.

DETAILED DESCRIPTION OF THE INVENTION

In order to better understand the method according to the invention, the description that follows is given, as an illustration and in a nonlimiting way, in the context of the diffusion of the wave from a cell phone through a layer of snow to the receivers on an airplane, for example represented in FIG. 1. The snow particles act as diffusers.

In this example, a diffuse or distributed source is characterized, for example, by a direction and a diffusion cone.

Before detailing the exemplary embodiment, a few reminders are given that may be helpful in understanding the method according to the invention.

General Case

In the presence of M transmitters being propagated along $P_m$ non-distributed multiple paths of incidences $(\theta_{mp}, \Delta_{mp})$ arriving at an array consisting of N sensors, the observation vector $x(t)$ below is received at the output of the sensors:

$$x(t) = \begin{bmatrix} x_1(t) \\ \vdots \\ x_N(t) \end{bmatrix} \quad (1)$$

$$= \sum_{m=1}^{M} \sum_{p=1}^{P_m} \rho_{mp} a(\theta_{mp}, \Delta_{mp}) s_m(t - \tau_{mp}) e^{j2\pi f_{mp} t} + b(t)$$

where $x_n(t)$ is the signal received on the nth sensor, $a(\theta, \Delta)$ is the response from the array of sensors to a source of incidence $\theta, \Delta, s_m(t)$ is the signal transmitted by the mth transmitter, $\tau_{mp}, f_{mp}$ and $\rho_{mp}$ are respectively the delay, the Doppler shift and the attenuation of the pth multiple path of the mth transmitter and $x(t)$ is the additive noise.

To determine the $M_T = P_1 + \ldots + P_M$ incidences $(\theta_{mp}, \Delta_{mp})$, the MUSIC method [1] seeks the $M_T$ minima $(\hat{\theta}_{mp}, \hat{\Delta}_{mp})$ that cancel the following pseudo-spectrum:

$$J_{MUSIC}(\theta, \Delta) = \frac{a^H(\theta, \Delta)\Pi_b a(\theta, \Delta)}{a^H(\theta, \Delta)a(\theta, \Delta)}, \quad (2)$$

where the matrix $\Pi_b$ depends on the $(N-M_T)$ natural vectors $e_{M_T+i}$ ($1 \leq i \leq N-M_T$) associated with the lowest natural values of the covariance matrix $R_{xx} = E[x(t) x(t)^H]$: $\Pi_b = E_b E_b^H$ where $E_b = [e_{M_T+1} \ldots e_N]$. It will also be noted that $u^H$ is the conjugate transpose of the vector u. The MUSIC method is based on the fact that the $M_T$ natural vectors $e_i$ ($1 \leq i \leq M_T$) associated with the highest natural values generate the space defined by the $M_T$ directing vectors $a(\theta_{mp}, \Delta_{mp})$ of the sources such as:

$$e_i = \sum_{m=1}^{M} \sum_{p=1}^{P_m} \alpha_{mpi} a(\theta_{mp}, \Delta_{mp}), \quad (3)$$

and that the vectors $e_i$ are orthogonal to the vectors of the noise space $e_{i+MT}$.

In the presence of M transmitters being propagated along $P_m$ distributed multiple paths, the following observation vector x(t) is obtained:

$$x(t) = \sum_{m=1}^{M} \sum_{p=1}^{P_m} x_{mp}(t) + b(t) \quad (4)$$

such that $$x_{mp}(t) = \int_{\theta_{mp}-\delta\theta_{mp}}^{\theta_{mp}+\delta\theta_{mp}} \int_{\Delta_{mp}-\delta\Delta_{mp}}^{\Delta_{mp}+\delta\Delta_{mp}} \rho(\theta,\Delta) a(\theta,\Delta) s_m(t-\tau(\theta,\Delta)) e^{j2\pi f(\theta,\Delta)t} d\theta d\Delta$$

where $(\theta_{mp}, \Delta_{mp})$ and $(\delta\theta_{mp}, \delta\Delta_{mp})$ respectively denote the center and the width of the diffusion cone associated with the pth multiple path of the mth transmitter. The parameters $\tau(\theta, \Delta)$, $f(\theta, \Delta)$ and $\rho(\theta, \Delta)$ are respectively the delay, the Doppler shift and the attenuation of the diffuser of incidence $(\theta, \Delta)$. In the presence of coherent diffusers, the delay $\tau(\theta, \Delta)$ and the Doppler shift $f(\theta, \Delta)$ are zero.

Theory of the Method According to the Invention

The invention is based notably on a breakdown of a diffusion cone into a finite number of diffusers. Using L to denote the number of diffusers of a source, the expression [4] can be rewritten as the following expression [5]:

$$x_{mp}(t) = \sum_{i=1}^{L} \rho_i a(\theta_{mp}+\delta\theta_{mpi}, \Delta_{mp}+\delta\Delta_{mpi}) s_m(t-\tau_{mp}-\delta\tau_{mpi}) e^{j2\pi(fmp+\delta fmpi)t}$$

The expression (5) makes it possible to bring things back to the model of discrete sources (diffusers) of the expression [1] by considering that the individual source is the diffuser of incidence $(\theta_{mp}+\delta\theta_{mpi}, \Delta_{mp}+\delta\Delta_{mpi})$ associated with the ith diffuser of the pth multiple path of the mth transmitter. In these conditions, the signal space of the covariance matrix $R_{xx}=E[x(t) x(t)^H]$ is generated by the vectors $a(\theta_{mp}+\delta\theta_{mpi}, \Delta_{mp}+\delta\Delta_{mpi})$. By using K to denote the rank of the covariance matrix $R_{xx}$, it can be deduced from this that its natural vectors $e_i$ ($1 \leq i \leq K$) associated with the highest natural values satisfy, according to [3], the following expression:

$$e_i = \sum_{m=1}^{M} \sum_{p=1}^{P_m} c(\theta_{mp}, \Delta_{mp}, \delta\theta_{mp}, \delta\Delta_{mp}, \alpha_{mp}^j) \text{ for } 1 \leq i \leq K \quad (6)$$

such that $$c(\theta, \Delta, \delta\theta, \delta\Delta, \alpha) = \sum_{j=1}^{L} \alpha_j a(\theta+\delta\theta_j, \Delta+\delta\Delta_j)$$

with $$\delta\theta = \begin{bmatrix} \delta\theta_1 \\ \vdots \\ \delta\theta_L \end{bmatrix}, \delta\Delta = \begin{bmatrix} \delta\Delta_1 \\ \vdots \\ \delta\Delta_L \end{bmatrix} \text{ and } \alpha = \begin{bmatrix} \alpha_1 \\ \vdots \\ \alpha_L \end{bmatrix}$$

In the presence of coherent diffusers where $\delta\tau_{mpi}=0$ and $\delta f_{mpi}=0$, it should be noted that the rank of the covariance matrix satisfies: $K=M_T=P_1+\ldots+P_M$. In the general case of partially-correlated diffusers where $\delta\tau_{mpi}\neq 0$ and $\delta f_{mpi}\neq 0$, this rank satisfies $K \geq M_T=P_1+\ldots+P_M$. In the present invention, it is assumed that $c(\theta_{mp}, \Delta_{mp}, \delta\theta_{mp}, \delta\Delta_{mp}, \alpha_{mp}^i)$ is one of the directing vectors associated with the pth multiple path of the mth transmitter and that the unknown parameters are the average incidence $(\theta_{mp}, \Delta_{mp})$, the angle differences of the diffusers $(\delta\theta_{mp}, \delta\Delta_{mp})$ and one of the vectors $\alpha_{mp}^i$.

Case of Goniometry in Azimuth and in Elevation

1st Variant

Figure 4:
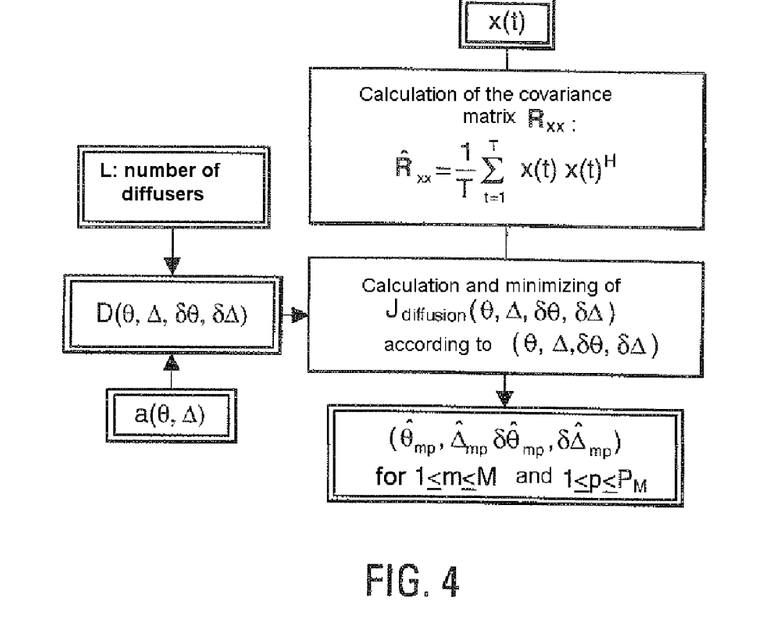

FIG. 4 diagrammatically represents the steps implemented according to a first variant of embodiment of the method.

To sum up, the diffusion cone is broken down into L individual diffusers (equation [5]), the different directing vectors $a(\theta_{mp}+\delta\theta_{mpi}, \Delta_{mp}+\delta\Delta_{mpi})$ are combined, which causes a vector $D(\theta, \Delta, \delta\theta, \delta\Delta) \alpha$ to be obtained, to which is applied a MUSIC-type or goniometry criterion in order to obtain the four parameters $\theta_{mp}, \Delta_{mp}, \delta\theta_{mp}, \delta\Delta_{mp}$ which minimize this criterion (the MUSIC criterion is applied to a vector resulting from the linear combination of the different directing vectors).

To determine these parameters with a MUSIC-type algorithm [1], it is essential, according to equations [2] and [6], to find the minima $(\hat{\theta}_{mp}, \hat{\Delta}_{mp}, \delta\hat{\theta}_{mp}, \alpha_{mp}^i)$ which cancel the following pseudo-spectrum:

$$J_{MUSIC\_diff}(\theta, \Delta, \delta\theta, \delta\Delta, \alpha) = \frac{c^H(\theta, \Delta, \delta\theta, \delta\Delta, \alpha)}{c^H(\theta, \Delta, \delta\theta, \delta\Delta, \alpha)}, \quad (7)$$

$$c(\theta, \Delta, \delta\theta, \delta\Delta, \alpha)$$

Where the matrix $\Pi_b$ depends on the (N-K) eigenvectors $e_{MT+i}$ ($1 \leq i \leq N-K$) associated with the lowest natural values of the covariance matrix $R_{xx}=E[x(t) x(t)^H]$: $\Pi_b=E_b E_b^H$ where $E_b=[e_{K+1} \ldots e_N]$. Noting, according to the expression [6], that the vector $c(\theta, \Delta, \delta\theta, \delta\Delta, \alpha)$ can be written in the following form:

$$c(\theta,\Delta,\delta\theta,\delta\Delta,\alpha)=D(\theta,\Delta,\delta\theta,\delta\Delta)\alpha, \quad (8)$$

with $D(\theta, \Delta, \delta\theta, \delta\Delta)=[a(\theta+\delta\theta_1, \Delta+\delta\Delta_1) \ldots a(\theta+\delta\theta_L, \Delta+\delta\Delta_L)]$, it is possible to deduce from this that the criterion $J_{MUSIC\_diff}(\theta, \Delta, \delta\theta, \delta\Delta, \alpha)$ becomes:

$$J_{MUSIC\_diff}(\theta, \Delta, \delta\theta, \delta\Delta, \alpha) = \frac{\alpha^H Q_1(\theta, \Delta, \delta\theta, \delta\Delta) \alpha}{\alpha^H Q_2(\theta, \Delta, \delta\theta, \delta\Delta) \alpha}, \quad (9)$$

with $Q_1(\theta, \Delta, \delta\theta, \delta\Delta)=D(\theta, \Delta, \delta\theta, \delta\Delta)^H \Pi_b D(O\theta, \Delta, \delta\theta, \delta\Delta)$, and $Q_2(\theta, \Delta, \delta\theta, \delta\Delta)=D(\theta, \Delta, \delta\theta, \delta\Delta)^H D(\theta, \Delta, \delta\theta, \delta\Delta)$, The technique will firstly consist in minimizing the criterion $J_{MUSIC\_diff}(\theta, \Delta, \delta\theta, \delta\Delta, \alpha)$ with $\alpha$. According to the technique described in reference [2], for example, the criterion $J_{min\_diff}(\theta, \Delta, \delta\theta, \delta\Delta)$ below is obtained:

$$J_{min\_diff}(\theta,\Delta,\delta\theta,\delta\Delta)=\lambda_{min}\{Q_1(\theta,\Delta,\delta\theta,\delta\Delta)Q_2(\theta,\Delta,\delta\theta,\delta\Delta)^{-1}\} \quad (10)$$

where $\lambda_{min}(Q)$ denotes the minimum natural value of the matrix Q. Noting that the criterion $J_{min\_diff}(\theta, \Delta, \delta\theta, \delta\Delta)$ should be cancelled out for the quadruplets of parameters $(\theta_{mp},\Delta_{mp},\delta\theta_{mp},\delta\Delta_{mp})$ and that $\det(AB^{-1})=\det(A)/\det(B)$, it can be deduced from this that the quadruplets of parameters $(\theta_{mp},\Delta_{mp},\delta\theta_{mp},\delta\Delta_{mp})$ also cancel the following criterion:

$$J_{diffusion}(\theta,\Delta,\delta\theta,\delta\Delta)=\det(Q_1(\theta,\Delta,\delta\theta,\delta\Delta))/\det(Q_2(\theta,\Delta,\delta\theta,\delta\Delta)), \quad (11)$$

where $\det(Q)$ denotes the determinant of the matrix Q. The $M_T$ quadruplets of parameters $(\theta_{mp},\Delta_{mp},\delta\theta_{mp},\delta\Delta_{mp})$ which minimize the criterion $J_{diffusion}(\theta, \Delta, \delta\theta, \delta\Delta)$ are therefore sought.

Figure 5:
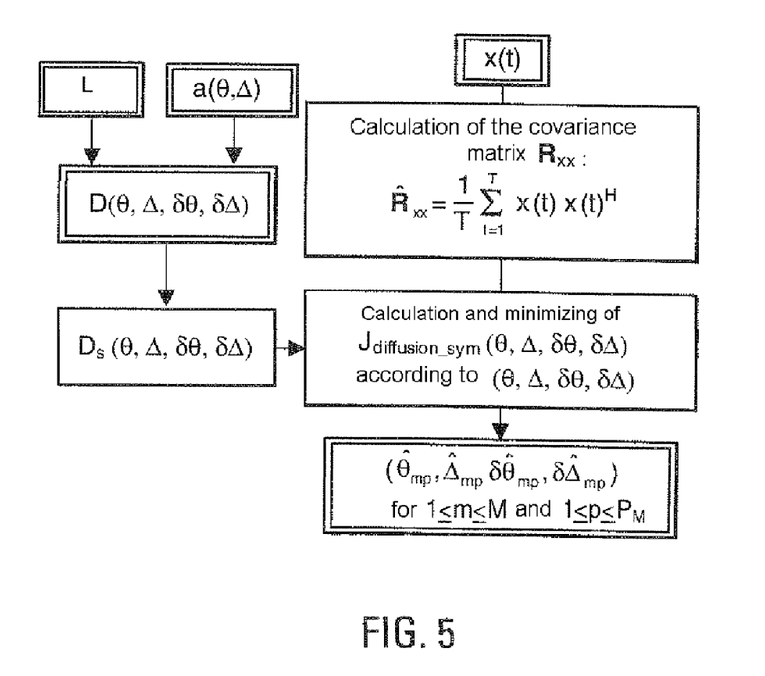

FIG. 5 represents the steps of a variant of embodiment taking account of the symmetry of the incidence solution.

Indeed, if $(\theta,\Delta,\delta\theta,\delta\Delta)$ is the solution, the same applies for $(\theta,\Delta,-\delta\theta,\delta\Delta)$ $(\theta,\Delta,\delta\theta,-\delta\Delta)$ $(\theta,\Delta,-\delta\theta,-\delta\Delta)$. From this comment, it is possible to deduce that:

$$c(\theta,\Delta,\delta\theta,\delta\Delta,\alpha)^H E_b=0,$$
$$c(\theta,\Delta,-\delta\theta,\delta\Delta,\alpha)^H E_b=0,$$
$$c(\theta,\Delta,\delta\theta,-\delta\Delta,\alpha)^H E_b=0,$$
$$c(\theta,\Delta,-\delta\theta,-\delta\Delta,\alpha)^H E_b=0 \quad (11\text{-}1)$$

Where the matrix $E_b$ depends on the (N−K) eigenvectors $e_{MT+i}$ ($1 \leq i \leq N-K$) associated with the lowest eigenvalues of the covariance matrix $R_{xx}=E[x(t) x(t)^H]$ such that: $E_b= [e_{K+1} \ldots e_N]$. From the expression (11-1) it can be deduced that, to estimate the parameters $(\theta_{mp},\Delta_{mp},\delta\theta_{mp},\delta\Delta_{mp})$, it is necessary to find the minima that cancel the following pseudo-spectrum:

$$J_{MUSIC\_diff\_sym}(\theta, \Delta, \delta\theta, \delta\Delta, \alpha) = \frac{\Pi_{bs} c_s(\theta, \Delta, \delta\theta, \delta\Delta, \alpha)}{c_s^H(\theta, \Delta, \delta\theta, \delta\Delta, \alpha)}, \quad c_s^H(\theta, \Delta, \delta\theta, \delta\Delta, \alpha) \quad (11\text{-}2)$$

$$c_s(\theta, \Delta, \delta\theta, \delta\Delta, \alpha) = \begin{bmatrix} c(\theta, \Delta, \delta\theta, \delta\Delta, \alpha) \\ c(\theta, \Delta, -\delta\theta, \delta\Delta, \alpha) \\ c(\theta, \Delta, \delta\theta, -\delta\Delta, \alpha) \\ c(\theta, \Delta, -\delta\theta, -\delta\Delta, \alpha) \end{bmatrix} \text{ and}$$

$$\Pi_{bs} = \frac{1}{4} E_{bs} E_{bs}^H$$

where $$E_{bs} = \begin{bmatrix} E_b \\ E_b \\ E_b \\ E_b \end{bmatrix}$$

According to the expression (8), the vector $c_s(\theta, \Delta, \delta\theta, \delta\Delta, \alpha)$ can be written as follows:

$$c_s(\theta, \Delta, \delta\theta, \delta\Delta, \alpha) = D_s(\theta, \Delta, \delta\theta, \delta\Delta)\alpha, \quad (11\text{-}3)$$

with $$D_s(\theta, \Delta, \delta\theta, \delta\Delta) = \begin{bmatrix} D(\theta, \Delta, \delta\theta, \delta\Delta) \\ D(\theta, \Delta, -\delta\theta, \delta\Delta) \\ D(\theta, \Delta, \delta\theta, -\delta\Delta) \\ D(\theta, \Delta, -\delta\theta, -\delta\Delta) \end{bmatrix},$$

The minimizing of $J_{MUSIC\_diff\_sym}(\theta, \Delta, \delta\theta, \delta\Delta, \alpha)$ relative to $\alpha$ will lead to the criterion $J_{diffusion\_sym}(\theta, \Delta, \delta\theta, \delta\Delta)$. To obtain $J_{diffusion\_sym}(\theta, \Delta, \delta\theta, \delta\Delta)$, all that is needed is to replace in the expressions (9) (11), $D(\theta, \Delta, \delta\theta, \delta\Delta)$ with its symmetrical correspondent $D_s(\theta, \Delta, \delta\theta, \delta\Delta)$ and $\Pi_b$ with $\Pi_{bs}$. The following is thus obtained:

$$J_{diffusion\text{-}sym}(\theta,\Delta,\delta\theta,\delta\Delta)=\det(Q_{1s}(\theta,\Delta,\delta\theta,\delta\Delta))/\det(Q_{2s}(\theta,\Delta,\delta\theta,\delta\Delta)), \quad (11\text{-}4)$$

with $Q_{1s}(\theta, \Delta, \delta\theta, \delta\Delta)=D_s(\theta, \Delta, \delta\theta, \delta\Delta)^H \Pi_{bs} D_s(\theta, \Delta, \delta\theta, \delta\Delta)$, and $Q_{2s}(\theta, \Delta, \delta\theta, \delta\Delta)=D_s(\theta, \Delta, \delta\theta, \delta\Delta)^H D_s(\theta, \Delta, \delta\theta, \delta\Delta)$, Therefore, the MT quadruplets of parameters $(\theta_{mp},\Delta_{mp},\delta\theta_{mp},\delta\Delta_{mp})$ which minimize the criterion $J_{diffusion\text{-}sym}(\theta, \Delta, \delta\theta, \delta\Delta)$ are sought.

2nd Variant

Figure 6:
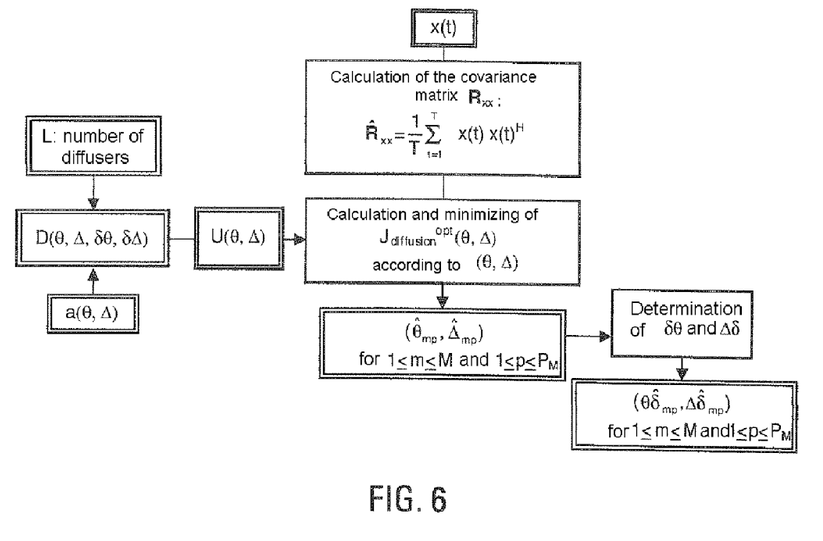

FIG. 6 represents a second variant of the goniometry of the diffuse sources in azimuth and elevation that offer notably the advantage of reducing the calculation costs.

The first variant of the goniometry of the sources involves calculating a pseudo-spectrum $J_{diffusion}$ dependent on four parameters $(\theta, \Delta, \delta\theta, \delta\Delta)$, two of which are vectors of length L. The objective of the second variant is to reduce this number of parameters by performing the limited development along directing vectors about a central incidence $(\theta, \Delta)$ corresponding to the center of the diffusion cone:

$$a(\theta + \delta\theta_i, \Delta + \delta\Delta_i) = a(\theta, \Delta) + \delta\theta_i \frac{\partial a(\theta, \Delta)}{\partial \theta} + \delta\Delta_i \frac{\partial a(\theta, \Delta)}{\partial \Delta} + \ldots \text{etc} \quad (12)$$

where $\partial(a(\theta, \Delta))^n/\partial\theta^{n-p}\partial\Delta^p$ denotes an nth derivative of the directing vector $a(\theta,\Delta)$. This corresponds to a limited development about the central incidence (change of base of the linear combination) according to the derivatives of the directing vectors dependent on the central incidence of the cone. From this last expression, it is possible to separate the incidences $(\theta,\Delta)$ and the deflections $(\delta\theta,\delta\Delta)$ as follows:

$$a(\theta + \delta\theta_i, \Delta + \delta\Delta_i) = U(\theta, \Delta) k(\delta\theta_i, \delta\Delta_i) \quad (13)$$

where $$U(\theta, \Delta) = \begin{bmatrix} a(\theta, \Delta) & \frac{\partial a(\theta, \Delta)}{\partial \theta} & \frac{\partial a(\theta, \Delta)}{\partial \Delta} & \ldots \end{bmatrix}$$

and $$k(\delta\theta_i, \delta\Delta_i) = \begin{bmatrix} 1 \\ \delta\theta_i \\ \delta\Delta_i \\ \vdots \end{bmatrix}$$

According to the expressions (6) (8) and (13), the vector $c(\theta, \Delta, \delta\theta, \delta\Delta, \alpha)$ becomes:

$$c(\theta, \Delta, \delta\theta, \delta\Delta, \alpha) = U(\theta, \Delta)\beta(\delta\theta, \delta\Delta, \alpha), \quad (14)$$

-continued with $$\beta(\delta\theta, \delta\Delta, \alpha) = \sum_{j=1}^{L} \alpha_j k(\delta\theta_i, \delta\Delta_j)$$

By replacing, in equation (9), $D(\theta, \Delta, \delta\theta, \delta\Delta)$ with $U(\theta, \Delta)$ and $\alpha$ with $\beta(\delta\theta, \delta\Delta, \alpha)$, it is possible to deduce from this, according to (9) (10) (1), that to estimate the $M_T$ incidences $(\theta_{mp}, \Delta_{mp})$ all that is needed is to minimize the following two-dimensional criterion:

$$J_{diffusion\_sym}^{opt}(\theta,\Delta) = \det(Q_1^{opt}(\theta,\Delta))/\det(Q_2^{opt}(\theta,\Delta)), \quad (15)$$

with
$Q_1^{opt}(\theta, \Delta) = U(\theta, \Delta)^H \Pi_b U(\theta, \Delta)$ and $Q_2^{opt}(\theta, \Delta) = U(\theta, \Delta)^H U(\theta, \Delta)$, Determining the vectors $\delta\theta_{mp}$ and $\delta\Delta_{mp}$ entails estimating the vectors $\beta(\delta\theta_{mp}, \delta\Delta_{mp}, \alpha)$. For this, all that is needed is to find the eigenvector associated with the minimum natural value of $Q_2^{opt}(\theta_{mp}, \Delta_{mp})^{-1} Q_1^{opt}(\theta_{mp}, \Delta_{mp})$.

Figure 7:
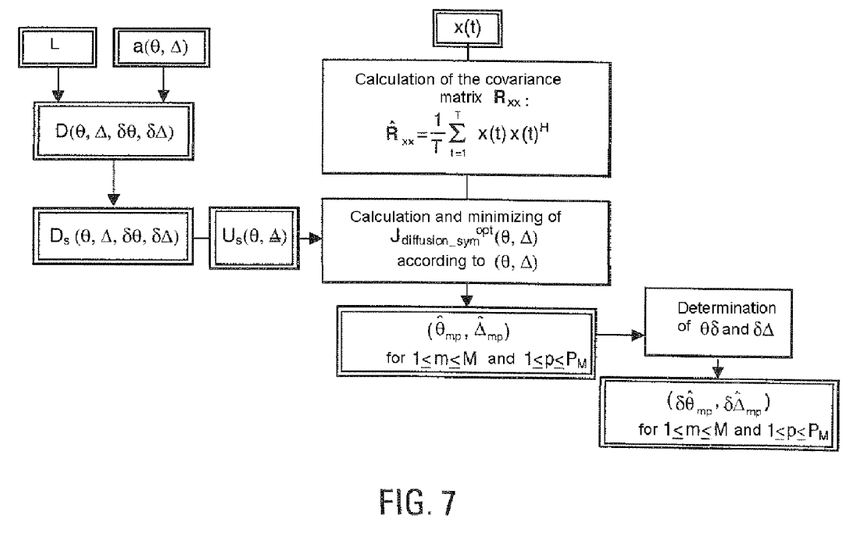

FIG. 7 represents a variant of the method of FIG. 6 which takes account of the symmetry of the solutions in order to eliminate some ambiguities. For this, it is important firstly to note that, according to (13) (14):

$$c(\theta,\Delta,-\delta\theta,\delta\Delta,\alpha) = U_1(\theta,\Delta)\beta(\delta\theta,\delta\Delta,\alpha)$$

with (15-1)

$$U_1(\theta, \Delta) = \left[a(\theta, \Delta) - \frac{\partial a(\theta, \Delta)}{\partial \theta} \frac{\partial a(\theta, \Delta)}{\partial \Delta} \ldots \right],$$

$$c(\theta, \Delta, \delta\theta, -\delta\Delta, \alpha) = U_2(\theta, \Delta)\beta(\delta\theta, \delta\Delta, \alpha)$$

with $$U_2(\theta, \Delta) = \left[a(\theta, \Delta) \frac{\partial a(\theta, \Delta)}{\partial \theta} - \frac{\partial a(\theta, \Delta)}{\partial \Delta} \ldots \right],$$

$$c(\theta, \Delta, -\delta\theta, -\delta\Delta, \alpha) = U_3(\theta, \Delta)\beta(\delta\theta, \delta\Delta, \alpha)$$

with $$U_3(\theta, \Delta) = \left[a(\theta, \Delta) - \frac{\partial a(\theta, \Delta)}{\partial \theta} - \frac{\partial a(\theta, \Delta)}{\partial \Delta} \ldots \right]$$

From this, according to (11-2), a new expression of the vector $c_s(\theta, \Delta, \delta\theta, \delta\Delta, \alpha)$ can be deduced:

$$c_s(\theta, \Delta, \delta\theta, \delta\Delta, \alpha) = U_s(\theta, \Delta)\beta(\delta\theta, \delta\Delta, \alpha) \text{ and} \quad (15\text{-}2)$$

$$U_s(\theta, \Delta) = \begin{bmatrix} U(\theta, \Delta, \alpha) \\ U_1(\theta, \Delta, \alpha) \\ U_2(\theta, \Delta, \alpha) \\ U_3(\theta, \Delta, \alpha) \end{bmatrix}$$

By replacing, in the equation (15), $U_s(\theta, \Delta)$ with $U(\theta, \Delta)$, it is possible to deduce from this, according to (11-2) (11-4), that to estimate the $M_T$ incidences $(\theta_{mp},\Delta_{mp})$ all that is needed is to minimize the following two-dimensional criterion:

$$J_{diffusion\_sym}^{opt}(\theta,\Delta) = \det(Q_{1s}^{opt}(\theta,\Delta))/\det(Q_{2s}^{opt}(\theta,\Delta)), \quad (15\text{-}3)$$

with $Q_{1s}^{opt}(\theta, \Delta) = U_s(\theta, \Delta)^H \Pi_{bs} U_s(\theta, \Delta)$ and
$Q_{2s}^{opt}(\theta, \Delta) = U_s(\theta, \Delta)^H U_s(\theta, \Delta)$ Case of 1D Goniometry in Azimuth The incidence of a source depends on a single parameter which is the azimuth $\theta$. In these conditions, the directing vector $a(\theta)$ is a function of $\theta$. In the presence of M transmitters being propagated along $P_m$ distributed multiple paths, the observation vector $x(t)$ of the equation (4) becomes:

$$x(t) = \sum_{m=1}^{M} \sum_{p=1}^{P_m} x_{mp}(t) + b(t)$$

such that $$x_{mp}(t) = \int_{\theta_{mp}-\delta\theta_{mp}}^{\theta_{mp}+\delta\theta_{mp}} \rho(\theta)a(\theta)s_m(t-\tau(\theta))e^{j2\pi f(\theta)t} d\theta \quad (16)$$

where $\theta_{mp}$ and $\delta\theta_{mp}$ respectively denote the center and the width of the diffusion cone associated with the pth multiple path of the mth transmitter. The parameters $\tau(\theta)$, $f(\theta)$ and $\rho(\theta)$ depend only on the azimuth $\theta$ of the diffuser. The equation (5) modeling a diffusion cone of a source with L diffusers becomes:

$$x_{mp}(t) = \sum_{i=1}^{L} \rho_i a(\theta_{mp}+\delta\theta_{mpi})s_m(t-\tau_{mp}-\delta\tau_{mpi})e^{j2\pi(fmp+\delta fmpi)t} \quad (17)$$

1st Variant

Figure 8:
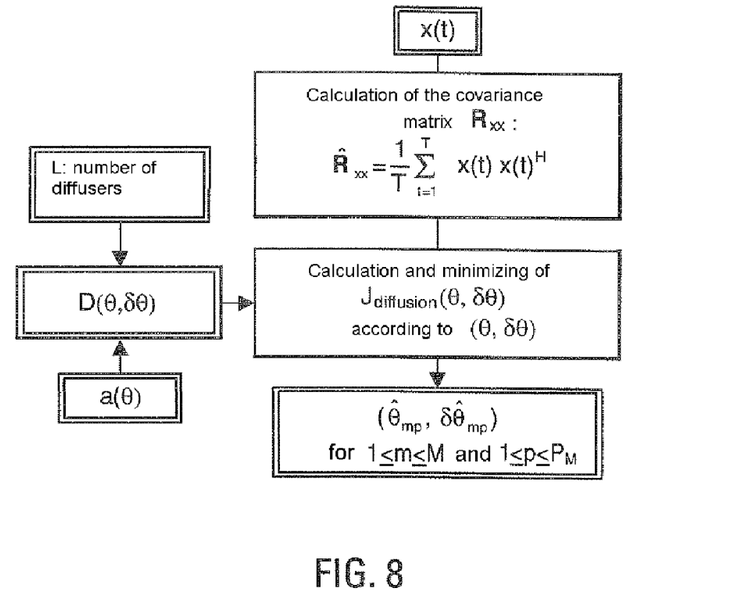

FIG. 8 diagrammatically represents the steps of the method for the goniometry of the distributed sources in azimuth.

Figure 9:
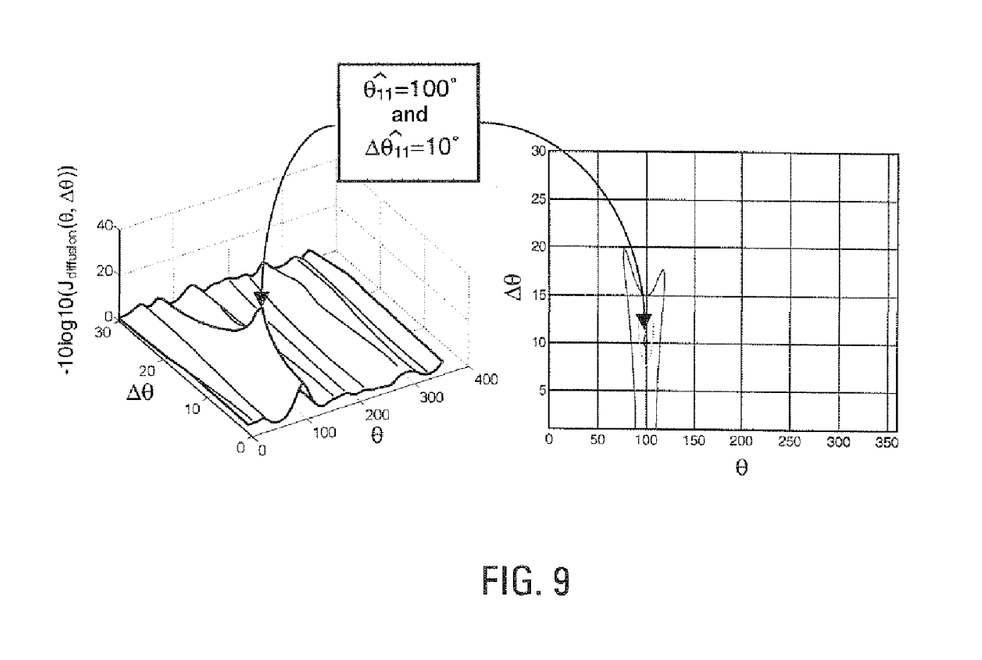

The objective of the 1D goniometry of the distributed sources is to determine the $M_T$ doublets of parameters $(\theta_{mp}, \delta\theta_{mp})$ which minimize the criterion $J_{diffusion}(\theta, \delta\theta)$. It is important to remember that $\delta\theta_{mp} = [\delta\theta_{mp1} \ldots \delta\theta_{mpL}]^T$, bearing in mind that $u^T$ denotes the transpose of u. According to the equations (11), (9) and (8), the criterion $J_{diffusion}(\theta, \delta\theta)$ becomes:

$$J_{diffusion}(\theta,\delta\theta) = \det(Q_1(\theta,\delta\theta))/\det(Q_2(\theta,\delta\theta)), \quad (18)$$

with $Q_1(\theta, \delta\theta) = D(\theta, \delta\theta)^H \Pi_b D(\theta, \delta\theta)$, $_2(\theta, \delta\theta) = D(\theta, \delta\theta)^H D(\theta, \delta\theta)$,
and $D(\theta, \delta\theta) = [a(\theta+\delta\theta_1) \ldots a(\theta+\delta\theta_L)]$ FIG. 9 simulates the case of a distributed source of average incidence $\theta_{11}=100°$ with a cone of width $\delta\theta_{11}=20°$ on a circular array with N=5 sensors of radius R such that $R/\lambda=0.8$ ($\lambda$ denotes the wavelength). In FIG. 9, the method is applied by breaking down the diffusion cone into L=2 diffusers such that $\delta\theta=[\Delta\theta-\Delta\theta]^T$. In these conditions, the criterion $J_{diffusion}(\theta, \delta\theta)$ depends only on the two scalars $\theta$ and $\Delta\theta$. In this FIG. 9, the function $-10 \log 10(J_{diffusion}(\theta, \Delta\theta))$ is plotted, where the maxima correspond to the estimates of the parameters sought.

FIG. 9 shows that the method can well be used to find the center of the diffusion cone in $\theta_{11}=100°$ and that the cone going from incidence 80° to 120° is broken down into two paths of incidences $\theta_{11}-\Delta\theta_{11}=90°$ and $\theta_{11}+\Delta\theta_{11}=110°$. Bearing in mind that the parameter $\Delta\theta_{11}$ reflects a barycentric distribution of the diffusers, it is possible to deduce from this that it is necessarily less than the width of the cone $\delta\theta_{11}$.

Figure 10:
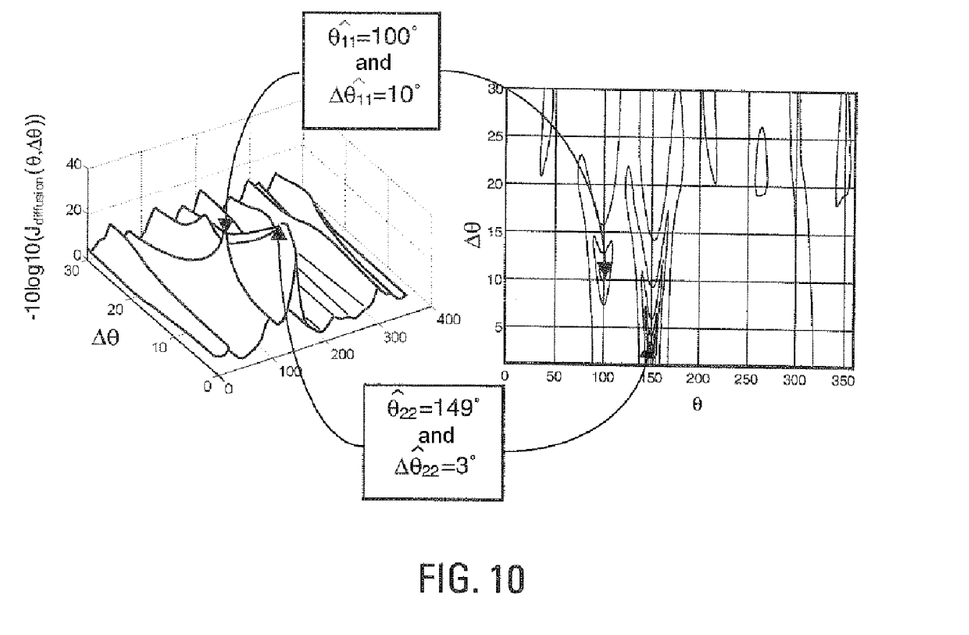

FIG. 10, with the same array of sensors, simulates the case of two distributed sources of average incidences $\theta_{11}=100°$ and $\theta_{22}=150°$ with cones of respective widths $\delta\theta_{11}=20°$ and $\delta\theta_{22}=5°$. As in the case of the simulation of FIG. 9, the goniometry is applied with L=2 diffusers where $\delta\theta=[\Delta\theta-\Delta\theta]^T$.

FIG. 10 shows that the method can be used to estimate with accuracy the centers of the diffusion cones $\theta_{11}$ and $\theta_{22}$ and the parameters $\Delta\theta_{11}$ and $\Delta\theta_{22}$ linked to the width of the diffusion cones such that the width of the cone satisfies: $\delta\theta_{mp}=2\times\Delta\theta_{mp}$.

Figure 11:
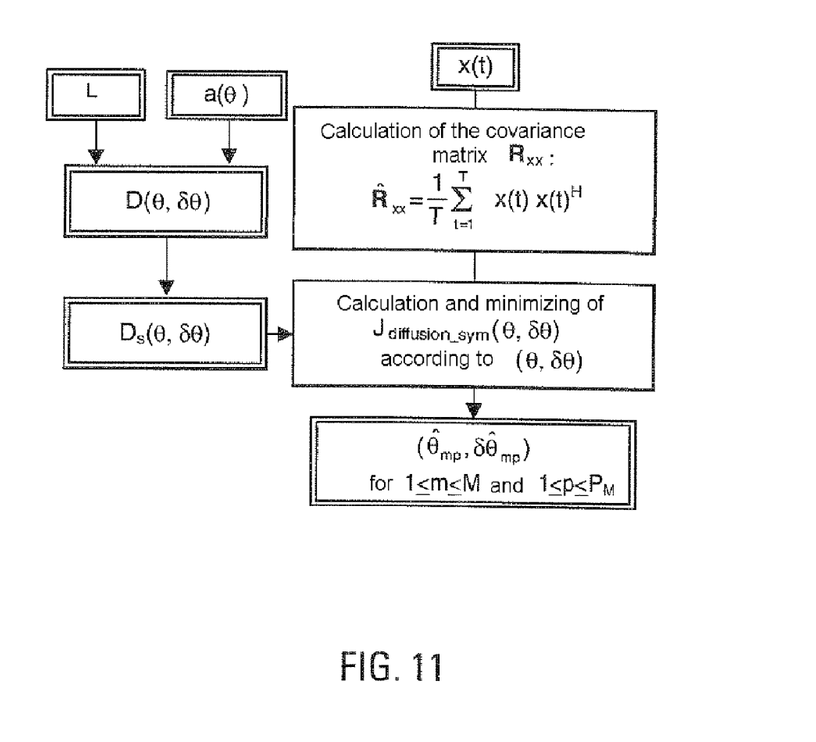

FIG. 11 represents the steps of the symmetrical version of the variant described in FIG. 8.

For a goniometry in azimuth, the solution $(\theta,\delta\theta)$ necessarily leads to the solution $(\theta,-\delta\theta)$. From this comment, it is possible to deduce the following two equations:

$$c(\theta,\delta\theta,\alpha)^H E_b = 0,$$

$$c(\theta,-\delta\theta,\alpha)^H E_b = 0,$$

such that, according to (6) (8) (18):

$$c(\theta, \delta\theta, \alpha) = \sum_{j=1}^{L} \alpha_j a(\theta + \delta\theta_j) = D(\theta, \delta\theta)\alpha, \quad (18\text{-}1)$$

where the matrix $E_b$ depends on the (N–K) eigenvectors $e_{MT+i}$ ($1 \leq i \leq N-K$) associated with the lowest natural values of the covariance matrix $R_{xx}=E[x(t) x(t)^H]$, such that: $E_b=[e_{K+1} \ldots e_N]$. From the expression (18-1) it can be deduced from this that to estimate the parameters $(\theta_{mp}, \delta\theta_{mp})$, it is necessary to search for the minima that cancel the following pseudo-spectrum:

$$J_{MUSIC\_diff\_sym}(\theta, \delta\theta, \alpha) = \frac{c_s^H(\theta, \delta\theta, \alpha)\Pi_{bs}c_s(\theta, \delta\theta, \alpha)}{c_s^H(\theta, \delta\theta, \alpha)c_s(\theta, \delta\theta, \alpha)}, \quad (18\text{-}2)$$

$$c_s(\theta, \delta\theta, \alpha) = \begin{bmatrix} c(\theta, \delta\theta, \alpha) \\ c(\theta, -\delta\theta, \alpha) \end{bmatrix} \text{ and}$$

$$\Pi_{bs} = \frac{1}{2}E_{bs}E_{bs}^H \text{ where}$$

$$E_{bs} = \begin{bmatrix} E_b \\ E_b \end{bmatrix}$$

According to the expressions (18-1) (18-2), the vector $c_s(\theta, \delta\theta, \alpha)$ can be written as follows:

$$c_s(\theta, \delta\theta, \alpha) = D_s(\theta, \delta\theta)\alpha, \quad (18\text{-}3)$$

with $$D_s(\theta, \delta\theta) = \begin{bmatrix} D(\theta, \delta\theta) \\ D(\theta, -\delta\theta) \end{bmatrix}.$$

The minimizing of $J_{MUSIC\_diff\_sym}(\theta, \delta\theta, \alpha)$ relative to $\alpha$ will lead to the criterion $J_{diffusion\_sym}(\theta, \delta\theta)$. To obtain $J_{diffusion\_sym}(\theta,\delta\theta)$, all that is needed is to replace in expression (18), $D(\theta,\delta\theta)$ with $D_s(\theta,\delta\theta)$ and $\Pi_b$ with $\Pi_{bs}$. The following is thus obtained:

$$J_{diffusion\text{-}sym}(\theta,\delta\theta)=\det(Q_{1s}(\theta,\delta\theta))/\det(Q_{2s}(\theta,\delta\theta)), \quad (18\text{-}4)$$

with $Q_{1s}(\theta, \delta\theta)=D_s(\theta, \delta\theta)^H \Pi_{bs} D_s(\theta, \delta\theta)$ and $Q_{2s}(\theta, \delta\theta)=D_s(\theta,\delta\theta)^H D_s(\theta, \delta\theta)$ The $M_T$ doublets of parameters $(\theta_{mp}, \delta\theta_{mp})$ that minimize the criterion $J_{diffusion\text{-}sym}(\theta,\delta\theta)$ are therefore sought.

2nd Variant

Figure 12:
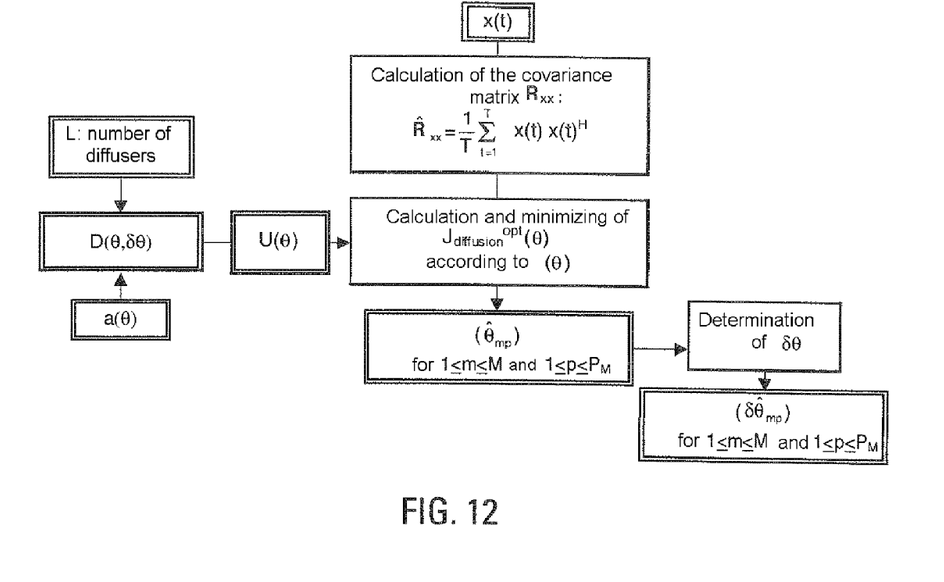

FIG. 12 diagrammatically represents the steps of the second variant of the goniometry of the distributed sources in azimuth.

By performing a limited development of the order I of $a(\theta+\delta\theta_i)$ about the central incidence $\theta$, the expression (13) becomes as follows:

$$a(\theta + \delta\theta_i) = U(\theta)k(\delta\theta_i) \quad (19)$$

where $$U(\theta) = \left[ a(\theta) \frac{\partial a(\theta)}{\partial \theta} \cdots \frac{\partial (a(\theta))^I}{\partial \theta^I} \right]$$

and $$k(\delta\theta_i) = \begin{bmatrix} 1 \\ \delta\theta_i \\ \vdots \\ \frac{\delta\theta_i^I}{I!} \end{bmatrix}$$

It can be deduced from this that the vector $c(\theta, \delta\theta, \alpha)$ of the expression (18-1) is written, according to (14):

$$c(\theta, \delta\theta, \alpha) = U(\theta)\beta(\delta\theta, \alpha) \quad (19\text{-}1)$$

with $$\beta(\delta\theta, \alpha) = \sum_{j=1}^{L} \alpha_j k(\delta\theta_j),$$

The aim of the second variant of the 1D goniometry of diffuse sources is to determine the $M_T$ incidences $\theta_{mp}$ that minimize the criterion $J_{diffusion}^{opt}(\theta)$. According to the equations (15) and (14), the criterion $J_{diffusion}^{opt}(\theta)$ becomes:

$$J_{diffusion}^{opt}(\theta)=\det(Q_1^{opt}(\theta))/\det(Q_2^{opt}(\theta)), \quad (20)$$

with $Q_1^{opt}(\theta)=U(\theta)^H \Pi_b U(\theta)$ and $Q_2^{opt}(\theta)=U(\theta)^H U(\theta)$, and $$\beta(\delta\theta, \alpha) = \sum_{j=1}^{L} \alpha_j k(\delta\theta_j),$$

Determining the vectors $\delta\theta_{mp}$ entails estimating the vector $\delta(\delta\theta_{mp}, \alpha)$: For this, all that is needed is to find the eigenvector associated with the minimum natural value of $Q_2^{opt}(\theta_{mp})^{-1} Q_1^{opt}(\theta_{mp})$.

Figure 13:
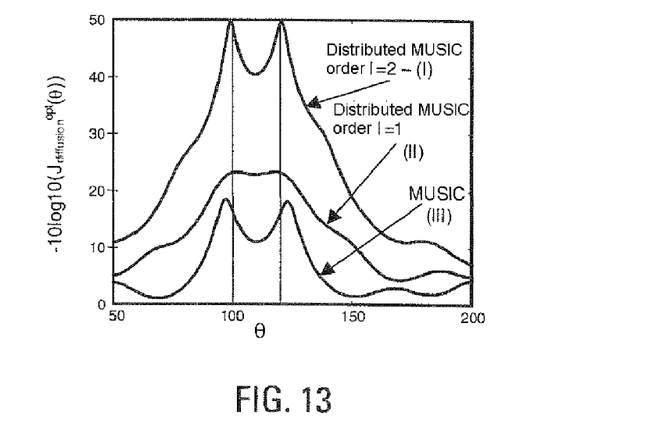

In FIG. 13, the MUSIC performance levels are compared with those of the second variant of distributed MUSIC for I=1 and I=2. The array of sensors is that of FIG. 9 and of FIG. 10. The case of two distributed sources of average incidence $\theta_{11}=100°$ and $\theta_{22}=120°$ with cones of respective width $\delta\theta_{11}=20°$ and $\delta\theta_{22}=20°$ is simulated. It should be remembered that the $M_T$ maxima of the function $-10 \log 10(J_{diffusion}^{opt}(\theta))$ are the estimates of the incidences $\theta_{mp}$ sought. The curves of FIG. 13 show that the more the order I of the limited development increases, the higher the level of the two maxima of the criterion becomes, because there is a convergence towards a good approximation of the model. Table 1 gives the estimates of the incidences for the three methods.

TABLE 1

Goniometry in azimuth of a distributed source ($\theta_{11} = 100°$ $\theta_{22} = 120°$ with a cone of width $\delta\theta_{11} = 20°$ $\delta\theta_{22} = 20°$) with the second variant

| | $\hat{\theta}_{11}$ given that $\theta_{11} = 100°$ | $\hat{\theta}_{22}$ given that $\theta_{22} = 120°$ |
|---|---|---|
| Conventional MUSIC (I = 0) | 97 | 123.1 |
| Distributed MUSIC (I = 1) | 101.7 | 118 |
| Distributed MUSIC (I = 2) | 99.2 | 120.6 |

Table 1 confirms that the lowest incidence estimation bias is obtained for I=2, that is, for the distributed MUSIC method of order of interpolation of the highest directing vector interpolation order. The simulation of FIG. 10 and of table 1 is obtained for a time spread of the two zero sources. More precisely, the delays $\delta\tau_{11i}$ and $\delta\tau_{22i}$ of (17) of the diffusers are zero. In the simulation of table 2 and of FIG. 11, the preceding configuration is retained, but with a time spread of one sampling period $T_e$ introduced such that: max $(\delta\tau_{mmi})$ − min $(\delta\tau_{mmi})=T_e$

TABLE 2

Goniometry in azimuth of partially correlated distributed sources $\theta_{11} = 100°$ $\theta_{22} = 120°$ with a cone of width $\delta\theta_{11} = 20°$ $\delta\theta_{22} = 20°$ with the 2nd variant

| | $\hat{\theta}_{11}$ given that $\theta_{11} = 100°$ | $\hat{\theta}_{22}$ given that $\theta_{22} = 120°$ |
|---|---|---|
| Conventional MUSIC (I = 0) | 96.2 | 124.3 |
| Distributed MUSIC (I = 2) | 98.1 | 121.5 |

Figure 14:
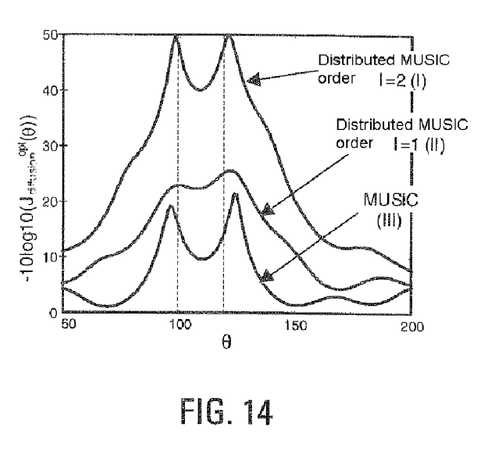

The results of Table 2 and of FIG. 14 show that the methods envisaged in this invention take into account the configurations of partially-correlated diffusers In this second variant it is possible, as in the first variant, to take into account the symmetry of the solutions in order to eliminate some ambiguities. For this, it should first be noted that, according to (19) (19-1):

$$c(\theta, -\delta\theta, \alpha) = U_1(\theta)\beta(\delta\theta, \alpha) \qquad (20\text{-}1)$$

with $$U_1(\theta) = \left[ a(\theta) - \frac{\partial a(\theta)}{\partial \theta} \ \ldots \ (-1)^I \frac{\partial(a(\theta))^I}{\partial \theta^I} \right]$$

According to (18-1) (18-2), a new expression of the vector $c_s(\theta, \delta\theta, \alpha)$ can be deduced:

$$c_s(\theta, \delta\theta, \alpha) = U_s(\theta)\beta(\delta\theta, \alpha) \qquad (20\text{-}2)$$

and $$U_s(\theta) = \begin{bmatrix} U(\theta, \alpha) \\ U_1(\theta, \alpha) \end{bmatrix}$$

Figure 15:
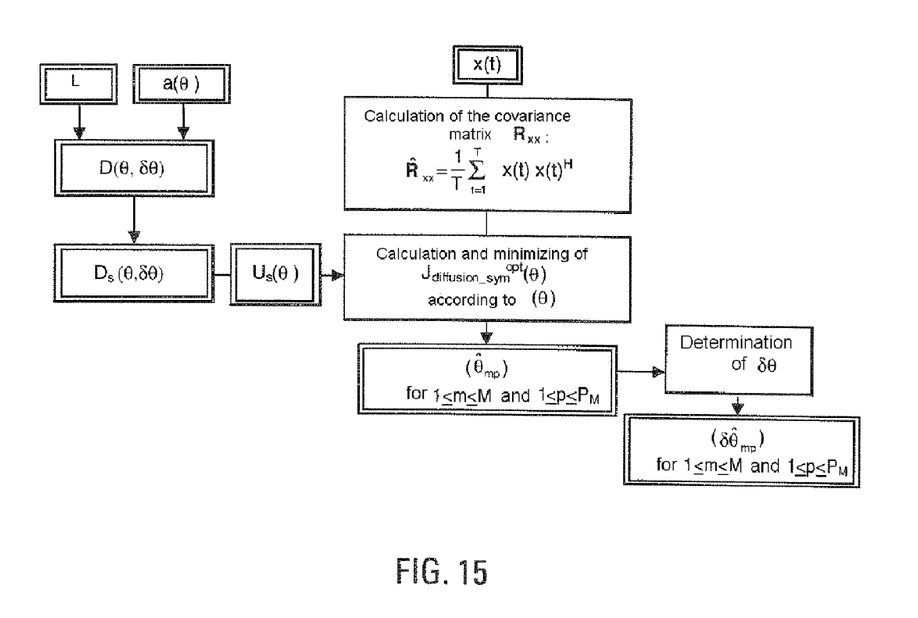

By replacing, in the equation (20) $U_s(\theta)$ with $U(\theta)$ and $\Pi_b$ with $\Pi_{bs}$, it can be deduced from this, according to (18-2) (18-4), that to estimate the $M_T$ incidences ($\theta_{mp}$), all that is needed is to minimize the following one-dimensional criterion:

$$J_{diffusion\_sym}^{opt}(\theta)=\det(Q_{1s}^{opt}(\theta))/\det(Q_{2s}^{opt}(\theta)), \qquad (20\text{-}3)$$

with $Q_{1s}^{opt}(\theta)=U_s(\theta)^H \Pi_{bs} U_s(\theta)$ and $Q_{2s}^{opt}(\theta)=U_s(\theta)^H U_s(\theta)$, This symmetrical version of the second variant of the goniometry of distributed sources in azimuth is summarized in FIG. 15.

[1] RO. SCHMIDT "A signal subspace approach to multiple emitter location and spectral estimation", PhD thesis, Stanford University CA, November 1981.

[2] FERRARA, PARKS "Direction finding with an array of antennas having diverse polarizations", IEEE trans on antennas and propagation, March 1983.

[3] S. VALAE, B. CHAMPAGNE and P. KABAL "Parametric Localization of Distributed Sources", IEEE trans on signal processing, Vol 43 no 9 September 1995.

[4] D. ASZTELY, B. OTTERSTEN and AL. SWINDLEHURST "A Generalized array manifold model for local scattering in wireless communications", Proc of ICASSP, pp 4021-4024, Munich 1997.

[5] M. BENGTSSON and B. OTTERSTEN "Low-Complexity Estimators for Distributed Sources", trans on signal processing, vol 48, no 8, August 2000.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A goniometry method of determining incidence parameters $\theta_{mp}$ and $\Delta_{mp}$ and deflection parameters $\delta\theta_{mp}$ and $\delta\Delta_{mp}$ of a diffusion cone, the diffusion cone being a model representing signals originated from a transmitter via a path to an array of sensors, the method comprising:

receiving, by the sensors, the signals originated from the transmitter via the path;

arranging the received signals according to an equation:

$$x_{mp}(t) = \sum_{i=1}^{L} \rho_j a(\theta_{mp} + \delta\theta_{mpi}, \Delta_{mp} + \delta\Delta_{mpi})s_m(t - \tau_{mp} - \delta\tau_{mpi})e^{j2\pi(fmp+\delta fmpi)t},$$

the diffusion cone being represented by L diffusers, and the ith diffuser having parameters ($\theta_{mp}$, $\delta\theta_{mpi}$, $\Delta_{mp}$, $\delta\Delta_{mpi}$), where $a(\theta_{mp}+\delta\theta_{mpi}, \Delta_{mp}+\delta\Delta_{mpi})$ represent a directing vector associated with the ith diffuser, $\theta_{mp}$ is the incidence angle in azimuth for the transmitter, $\delta\theta_{mpi}$ is the offset in azimuthal angle of incidence corresponding to the ith diffuser, $\Delta_{mp}$ is the elevation angle of incidence for the transmitter, $\delta\Delta_{mpi}$ is the offset in elevational angle of incidence corresponding to the ith diffuser, $\tau$ represents delays, f represents Doppler shifts, and $\rho$ represents attenuation;

deriving a vector $D(\theta, \Delta, \delta\theta, \delta\Delta) \alpha$ by combining the directing vectors associated with the L diffusers or deriving a vector $U(\theta, \Delta) \beta (\delta\theta, \delta\Delta, \alpha)$ according to a directing vector $a(\theta, \Delta)$ and derivatives of the directing vector a(θ, Δ), where α represents a combination vector associated with the L diffusers;

applying a MUSIC-type goniometry algorithm based on the vector D(θ, Δ, δθ, δΔ) α or the vector U(θ, Δ) β (δθ, δΔ, α) to determine at least one of the parameters $θ_{mp}$, $Δ_{mp}$, $δθ_{mp}$, or $δΔ_{mp}$.

2. The goniometry method as claimed in claim 1, wherein the MUSIC-type goniometry algorithm comprises a minimizing step performed based on the vector D(θ, Δ, δθ, δΔ).

3. The goniometry method as claimed in claim 2, wherein the MUSIC-type goniometry algorithm comprises a minimizing step performed based on a vector $D_s$(θ, Δ, δθ, δΔ), which is derived from the vector D(θ, Δ, δθ, δΔ), where the parameters δθ and/or δΔ in D(θ, Δ, δθ, δΔ) is/are replaced by additive inverse(s) thereof.

4. The goniometry method as claimed in claim 1, further comprising:

separating the incidence parameters and the deflection parameters;

wherein the MUSIC-type goniometry algorithm comprises a minimizing step performed according to the parameters (θ, Δ) on a matrix U(θ, Δ) in order to determine the incidence parameters $θ_{mp}$, $Δ_{mp}$, then subsequently to determine the deflection parameters $δθ_{mp}$, $δΔ_{mp}$ from the incidence parameters $θ_{mp}$, $Δ_{mp}$.

5. The goniometry method as claimed in claim 4, wherein the minimizing step is performed on the matrix $U_s$(θ, Δ) derived from U(θ) by replacing the parameters δθ and/or δΔ with additive inverse(s) thereof.

6. The goniometry method as claimed in claim 1, wherein the MUSIC-type goniometry algorithm comprises a minimizing step performed based on the vector D(θ, δθ) which depends only on the azimuth angle θ and on the deflection vector δθ corresponding to the azimuth angle θ.

7. The goniometry method as claimed in claim 6, wherein the minimizing step is performed on the matrix $D_s$(θ, δθ), which is derived from the vector D(θ, δθ), where the parameter δθ in D(θ, δθ) is replaced by additive an inverse thereof.

8. The goniometry method as claimed in claim 1, wherein the MUSIC-type goniometry algorithm comprises a minimizing step being performed based on a matrix U(θ), which depends only on the azimuth angle θ, in order to determine the incidence parameter $θ_{mp}$ and to subsequently determine the deflection parameters $δθ_{mp}$.

9. The goniometry method as claimed in claim 8, wherein the minimizing step is performed on the matrix $U_s$(θ) derived from U(θ) by replacing the parameters δθ with additive inverse(s) thereof.

* * * * *